United States Patent [19]
Lindeman

[11] 3,913,377
[45] Oct. 21, 1975

[54] FRICTION TESTING MACHINE FOR LUBRICANTS

[75] Inventor: Myrl A. Lindeman, Newtown Square, Pa.

[73] Assignee: Sun Oil Company of Pennsylvania, Philadelphia, Pa.

[22] Filed: Dec. 17, 1973

[21] Appl. No.: 425,581

[52] U.S. Cl. .......................................... 73/10; 73/10
[51] Int. Cl.² ..................... G01N 3/56; G01N 19/02
[58] Field of Search ............................. 73/10, 9, 64

[56] References Cited
UNITED STATES PATENTS

| | | | |
|---|---|---|---|
| 2,909,056 | 10/1959 | Neely | 73/10 |
| 3,129,580 | 4/1964 | Furey et al. | 73/10 |
| 3,375,699 | 4/1968 | Lindeman | 73/10 |

OTHER PUBLICATIONS

Azzam, pp. 7, 8, FIG. 15; American Society of Lubrication Engineers, p. 18; 1968; Model LFW-3.
Azzam, pp. 6-7, FIG. 6, American Society of Lubrication Engineers, p. 87; 1968; Hohman A-6 Tester.
W. R. Hill; Electronics in Engineering; McGraw-Hill Book Co., Inc.; 1961, pp. 303-304.
Hani T. Azzam (Dow Corning Corp.); "Testing Solid Lubricants;" Apr. 27, 1970; pp. 1-11.

*Primary Examiner*—James J. Gill
*Assistant Examiner*—Anthony V. Ciarlante
*Attorney, Agent, or Firm*—George L. Church; Donald R. Johnson; William C. Rock

[57] ABSTRACT

A disc, rotated continuously by a variable-speed driving means, has friction members clamped against its opposite faces by means of a calibrated, adjustable mechanism which controls the "normal" force holding the members against the disc. The friction force between the members and the disc may be determined by measuring the tangential force produced on the members as the disc rotates. One edge of the disc dips into a bath of the lubricant being tested, to provide lubricant at the juxtaposed disc and member surfaces. A heating means may be provided for the bath, to enable testing at elevated temperatures.

5 Claims, 9 Drawing Figures

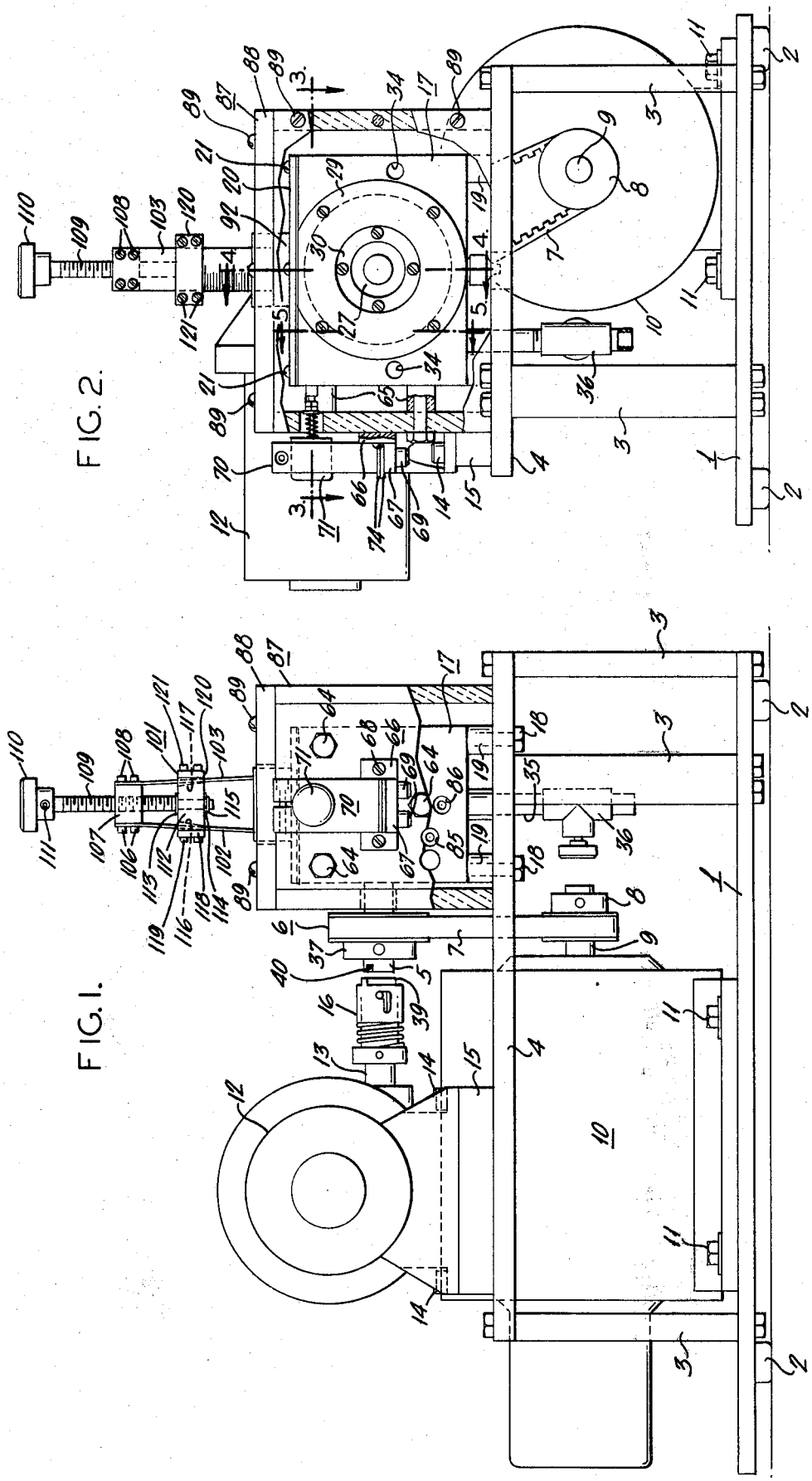

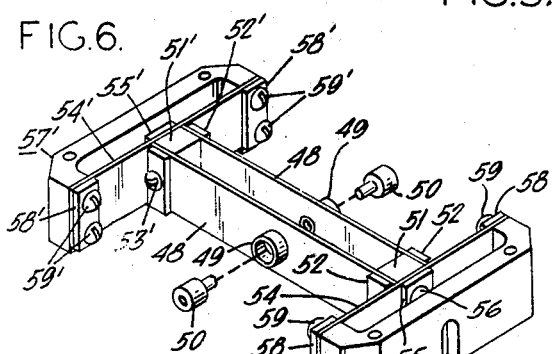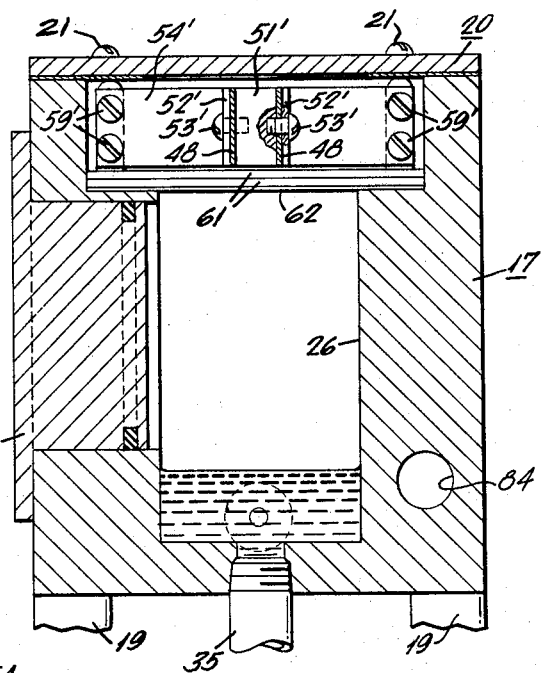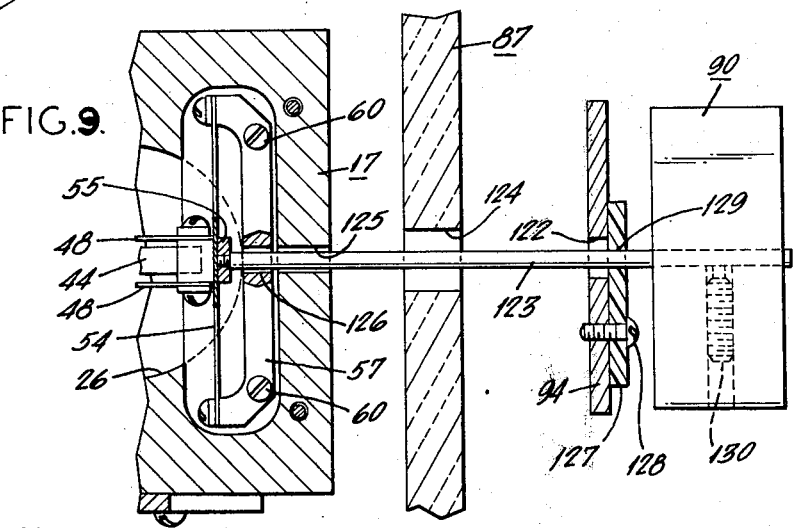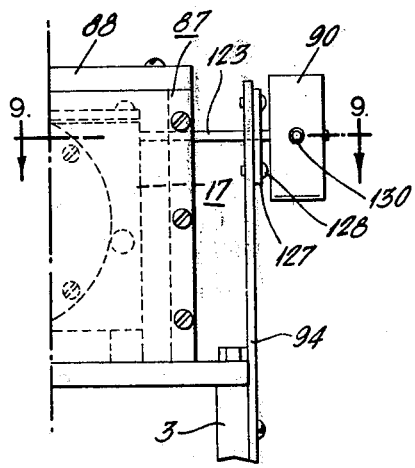

FRICTION TESTING MACHINE FOR LUBRICANTS

This invention relates to a testing machine, and more particularly to a friction testing machine for lubricants.

For the development and/or production (i.e., commercialization) of lubricants, various test measurements may be needed. One test may involve the determination of the coefficient of friction when using various different lubricants. Another test may measure the variation of the coefficient of friction for a lubricant with time, that is, as the test lubricant deteriorates or fatigues. Still another test may measure the frictional wear rates of particular solid materials, for different lubricants.

An object of this invention is to provide a novel machine for the friction testing of lubricants.

Another object is to provide a method and apparatus (machine) for carrying out, with a single device, any chosen one of the tests mentioned previously.

A further object is to provide a machine wherein the friction tests mentioned may be carried out over a wide range of test conditions or parameters (e.g., such parameters as rubbing speed, loading, and lubricant temperature).

A detailed description of the invention follows, taken in conjunction with the accompanying drawings, wherein:

FIG. 1 is a front elevation of a friction testing machine according to this invention;

FIG. 2 is a side elevation of the testing machine;

FIG. 5 is a fragmentary vertical cross-section taken along line 5—5 of FIG. 2;

FIG. 6 is an isometric view of a plug beam assembly, together with the cantiliver mounting means therefor;

FIG. 7 is a view similar to FIG. 6, but illustrating a block beam assembly;

FIG. 8 is a fragmentary side elevation showing an attachment which may be used on the machine under certain conditions; and FIG. 9 is a cross-sectional view taken along line 9—9 of FIG. 8.

Figure 3:
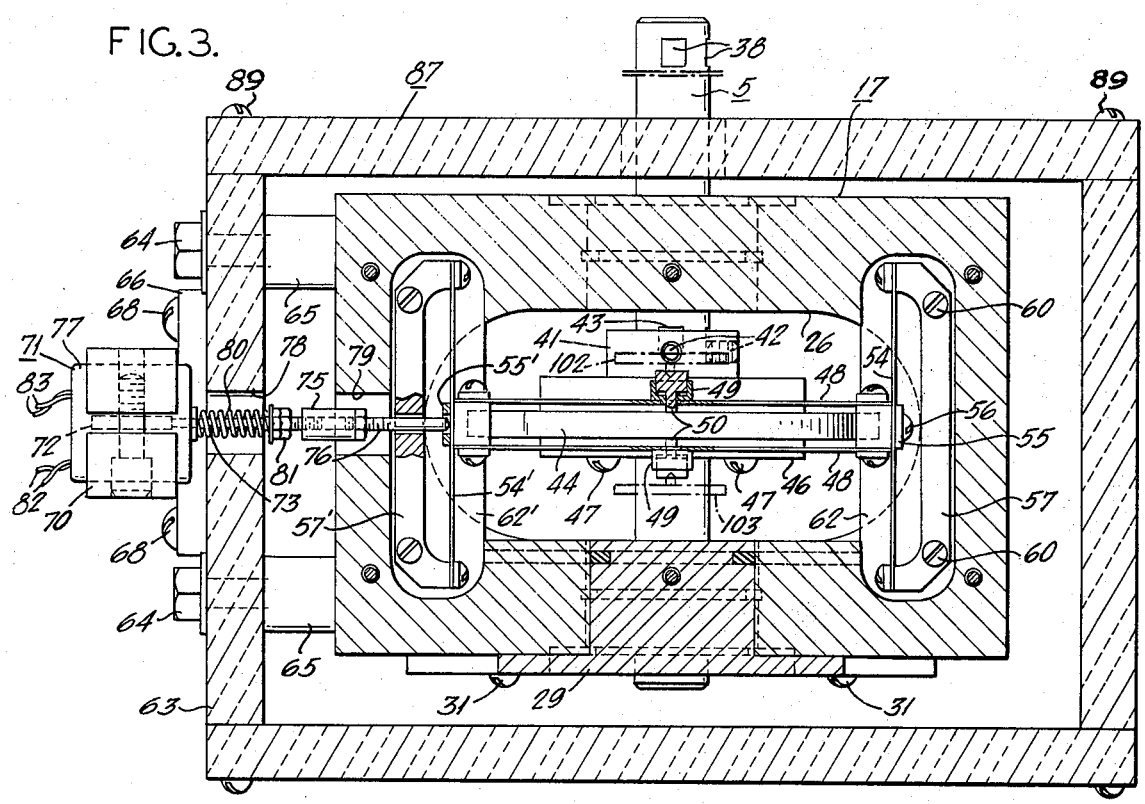
FIG. 3 is a horizontal cross-section taken along line 3—3 of FIG. 2.

Now referring to the drawings, a rectangular plate 1 serves as a supporting base for the machine of this invention. Three rubber feet 2 are secured in any suitable manner to the bottom side of plate 1, at appropriate locations. Three spaced upstanding rectangular prismatic rigid column members 3, each of which is bolted at its lower end to plate 1, provide a mounting for a flat rigid L-shaped supporting shelf 4 which is bolted to the upper ends of the columns 3. Shelf 4 provides the principal support for the operating parts of the machine.

A shaft 5, which is journaled for rotation about a horizontal axis as will be described hereinafter, has secured to one end thereof a pulley 6, and a drive belt 7 passes over this pulley and also over a pulley 8 secured to the output shaft 9 of a variable-speed electric driving motor 10. Motor 10 is firmly fastened to base plate 1 by means of four mounting bolts 11 which thread into tapped holes in this base.

The motor 10 may be termed the "high speed" driving motor, and is energized through a variable d.c. speed controller of conventional type which is mounted in a remote cabinet or enclosure (not shown), the speed of this motor being variable over a range of 26 to about 800 feet per minute (this feet per minute measurement referring to the surface speed at a point on a disc fastened to shaft 5, and to be later referred to). A meter (not shown), associated with the speed control, indicates the speed (in RPM) of the motor, and by multiplying this speed by a known constant which is about 0.65 (feet per revolution), the feet-per-minute speed is obtained.

For certain test procedures, it is desired to rotate the shaft 5 at a much lower speed, for example, over a range of 1 to 36 feet per minute (again referring to the disc surface speed). For these last-mentioned procedures, motor 10 is deenergized, and a separate "low speed" motor 12, whose ultimate output shaft 13 is driven through a built-in speed-reducing gear box (not specifically shown) from the motor 12, is utilized to drive shaft 5. Motor 12 is bolted as at 14 to shelf 4, a spacer 15 being interposed between the motor base and the shelf so that the axis of shaft 13 is collinear with the axis of shaft 5. The "low-motor" output shaft 13 is coupled to one side of a conventional spring-loaded manually-operable clutch mechanism 16, by means of which the shaft 13 may be coupled to shaft 5 so as to drive the latter directly (when so desired), at a relatively low rate of speed.

The motor 12 is similarly energized through a variable d.c. speed controller, so that the speed of motor 12 may be varied as desired. The potentiometer on this speed controller may be calibrated (if desired), to provide a measure of the speed of motor 12.

An aluminum box 17, of rectangular prismoidal outer configuration (by way of example, 4½ inches by 3 inches by 3⅝ inches in height), is mounted on shelf 4 by means of three bolts 18 which extend through respective cylindrical spacers 19 (made of the heat-insulating material known as Mycalex) and thread into the bottom of box 17. This aluminum box has an interior chamber 26 which contains the principal operating parts of the testing machine being described. The box 17 has a removable lid or cover 20 which is gasketed on its inner surface and which is fastened in position by means of screws 21.

Figure 4:
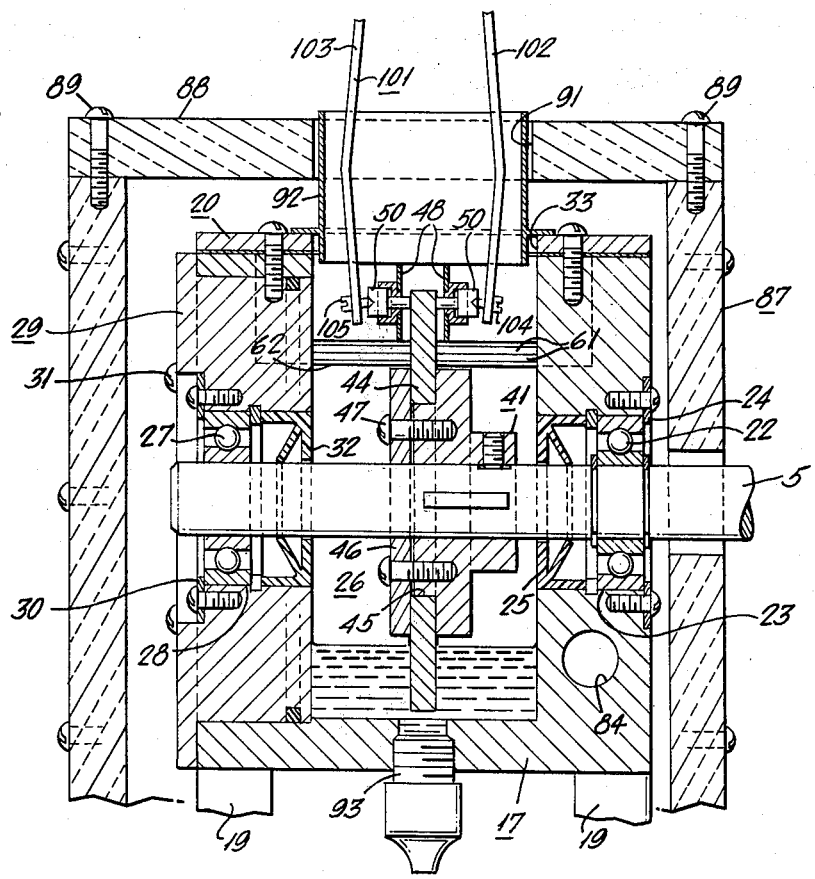
FIG. 4 is a fragmentary vertical cross-section taken along line 4—4 of FIG. 2.

Refer now more specifically to FIGS. 3 and 4, which are views illustrating the elements directly associated with the box 17. The shaft 5 carries at one end thereof (which is its upper end in FIG. 3) the pulley 6 (not shown in FIG. 3). Shaft 5 is sealed into and through the chamber 26, and is journaled for rotation in the opposite walls of such chamber.

Adjacent the pulley end of shaft 5, there is provided a shaft ball bearing 22 mounted in an opening 23 in box 17, this bearing being retained in position at its outer side by means of a clamp ring 24 fastened to the box. Retaining rings as illustrated are utilized to retain the shaft in position longitudinally, and to retain the bearing 22 in position at its inner side. An oil seal 25 of conventional construction is utilized around shaft 5 at the inner side of bearing 22, between such bearing and the chamber 26.

At the opposite end of shaft 5, there is provided a shaft ball bearing 27 mounted in an opening 28 in a plug-like removable bearing holder 29 of larger diameter. Bearing 27 is retained in position at its outer side by means of a clamp ring 30 fastened to holder 29. The bearing holder 29 is removably secured by means of screws 31 to box 17. A retaining ring as illustrated is utilized to retain the bearing 27 in position at its inner side, and an oil seal 32 of conventional construction is utilized around shaft 5 at the inner side of bearing 27, between such bearing and the chamber 26.

Pulley 6 is secured to the outwardly-extending end of shaft 5 (to wit, the upper end thereof in FIG. 3) by means of one or more set screws (not shown) which are threaded radially through the integral hub 37 (FIG. 1) of pulley 6 and whose points engage respective "flats" such as 38 (FIG. 3) formed on the outer end of shaft 5. Thus, the "high speed" driving motor 10 can rotate shaft 5 in a continuous manner by means of the pulley-and-belt arrangement 6–8.

When the spring-loaded clutch 16 is moved to its operative position (i.e., toward the right in FIG. 1), the outwardly-extending diametral driving member 39 of the clutch engages a diametral groove 40 in the outer end of shaft 5, so that the "low speed" driving motor 12 can then rotate shaft 5 in a continuous manner.

The box lid 20 has a central opening 33 therein, of square configuration. This opening communicates with the chamber 26, which latter is closed at its lower end, as may be seen in FIG. 5. The chamber 26 has a flattened elliptical cross-section, as may be seen in FIG. 3. For testing of a lubricant, a 30–70 cc. sample of the lubricant to be tested is poured into the chamber 26 via the opening 33, this volume of lubricant filling the chamber to a depth of about a half-inch. For enabling removal of the lubricant after the test is completed, a tapped hole is provided in the bottom wall of box 17, this hole communicating with the chamber 26. One end of a pipe nipple 35 is threaded into this hole, and a drain valve 36 (which is in the space between shelf 4 and base 1) is threadably coupled to the other end of nipple 35. The nipple 35 extends downwardly from box 17 through an appropriate hole (not shown) provided in shelf 4.

As previously described, shaft 5 extends through the chamber 26, parallel to the shorter cross-sectional dimension thereof, and approximately centrally of the length thereof (see FIG. 2). Within chamber 26, a central hub 41 is fastened to shaft 5 by means of a pair of set screws 42 which are threaded radially through this hub and whose points engage respective "flats" 43 formed on shaft 5. A rotatable test object, such as an annular disc 44, having an outer diameter sufficient to dip into the lubricant sample contained in chamber 26 (to an extent, for example, such that about one-half inch or less of the disc is covered, measured radially inwardly from the outer edge of the disc), is rotatably driven from shaft 5. The inner diameter of disc 44 fits against a shoulder 45 formed on hub 41, and a clamp plate 46, held to hub 41 by means of screws 47 which pass through plate 46 and thread into hub 41, clamps the radially-inner portion of disc 44 against the hub. Thus, disc 44 is securely fastened to shaft 5, and rotates therewith. As the disc 44 rotates continuously through the lubricant bath contained in the bottom of chamber 26, a film of lubricant is formed on all of the external surfaces of the disc which are wetted by the lubricant, and particularly on the two opposite circular faces of this disc.

The machine of this invention utilizes stationary friction members which are clamped against the opposite faces of the rotating and lubricant-wetted disc 44; during a test, the disc is rotated through the lubricant bath, as previously described. According to a first embodiment, friction plugs, made of an appropriate metal, are utilized as the friction members; according to a second embodiment, friction blocks (to which a friction surface made of an appropriate material is cemented, for a test) are utilized as the friction members. The structural details of these two embodiments differ slightly.

In the first-mentioned or "plug" embodiment, (see FIG. 6), a pair of plug beams 48, made of spring-tempered phosphor bronze 20 mils or less thick, extend parallel to the longer cross-sectional dimension of chamber 26, on respective opposite sides of the center line of the chamber and at respective opposite sides of the disc 44. The faces of these beams lie in respective vertical planes, so the beams are shown edgewise in FIG. 3. Each of the beams 48 has a reamed opening at its center which receives, with a frictional fit, the central boss of a respective cup-shaped plug holder 49 each of which has a reamed aperture in its base and an integral outwardly-extending boss surrounding such aperture. In each of the holders 49 there is mounted a friction plug 50 whose outer end, of larger diameter, fits snugly in the cup portion of the respective holder and whose inner end, of reduced diameter (about 1/16 inch diameter, for example), fits slidably through the reamed central opening of the respective holder. Thus, the smaller diameter inner ends of the two friction plugs 50 face each other and are adapted to bear respectively against the opposite circular faces of the disc 44, as the latter rotates.

Each plug 50 is free to move (to a limited extent) in an axial direction, with respect to its holder (this would be in a vertical direction in FIG. 3). A calipering mechanism (later to be desdribed), which is calibrated and is adjustable, is utilized to urge each of the plugs 50 inwardly in this direction, and thus to urge each of the plugs against the rotating disc. Said mechanism adjusts (and also provides a measure of) the normal "normal" force holding the plugs 50 against the disc 44.

At one end of the plug beams 48, a tie block 51 is inserted between the beams to maintain them a fixed distance apart, this block being fastened to the beams by means of two oppositely-disposed clamp plates 52, with screws 53 passing through the respective clamp plates 52 and through the respective beams 48 and threading into the tie block 51.

The tie block 51 is attached to the midpoint of a cantilever spring 54 by means of a clamp plate 55, screws 56 passing through the clamp plate 55 and through the cantilever 54 and threading into the tie block 51. Hence, the beams 48 are also attached to the cantilever 54. The cantilever 54 is made from spring-tempered phosphor bronze, tin plated, and may be 8 mils, 10 mils, or 12 mils in thickness, the different thicknesses of springs being used in the alternative, as needed for different test conditions. The cantilever 54 extends at a right angle to the beams 48, and the cantilever face lies in a vertical plane also, as may be seen in FIG. 3. Cantilever 54, the two ends of which are fixed, allows a small amount (on the order of 50 mils, for example), of lateral displacement (i.e., horizontal displacement in FIG. 3) to occur under test conditions. This will be further referred to hereinafter.

At each of its two ends, the cantilever 54 is attached to a respective leg of a U-shaped (seen in plan, as in FIG. 3) bridge member 57, by means of a respective cantilever clamp plate 58, screws 59 passing through the clamp plate 58 and through the cantilever 54 and threading into the bridge 57. The bridge 57 is in turn mounted in box 17 by means of a pair of screws 60 which pass through the bridge 57, then through a pair of removable spacers 61 (see FIG. 5), then through a baffle 62 (the purpose of which is to prevent the splashing of lubricant upwardly out of chamber 26 to cantilever 54, this baffle having an area substantially equal to the cross-sectional area of the elongated recess in the box in which the bridge 57 is mounted), and thread into the box 17.

At the opposite end of the plug beams 48, elements the same as those previously described (tie block, clamp plates, cantilever, bridge, etc.) are utilized, the elements at this "opposite" end being denoted by the same reference numerals but carrying prime designations; hence, the detailed description will not be repeated.

The inner ends of the stationary (fixed) friction plugs 50 are held against the circular faces of disc 44, as previously stated. When the latter rotates, a tangential force (which is the friction force desired to be measured in a test, and is one component of the coefficient of friction) is developed on the plugs 50, and this force tends to move the beams 48 horizontally (in FIG. 3) in one direction or the other (the direction depending, of course, on the direction of rotation of disc 44), against the restoring force presented by cantilevers 54 and 54'. Means, now to be described, are provided for measuring this tangential friction force.

A box end member 63, made of the heat insulating material known as Mycalex and which will hereinafter be referred to as a Mycalex box end, is secured to one end of box 17 (to wit, the left-hand or "primed" end in FIG. 3) by means of three screws 64 which pass through the Mycalex box end 63, through respectiv Mycalex spacers 65 which are positioned between the box end 63 and box 17, and thread into the end of box 17. A bracket 66 having an integral outstanding ledge portion 67 is secured to the Mycalex box end by means of screws 68. Mounted on the ledge 67, and secured thereto by means of a pair of screws 69, is a clamp 70 which carries an electromechanical transducer of the differential-transformer type, denoted generally by numeral 71. A pair of spacers 74, each of which is equal in thickness to any one of the spacers 61, 61', previously mentioned, are inserted between the ledge 67 and the bottom of the clamp 70.

The transducer (differential transnformer) 71 includes an elongated cylindrical core 72 of ferromagnetic material mounted on an extension screw 73 to one end of which is coupled, by means of a threaded coupling 75, another extension screw 76. The extension screws 73, 76 mount the core 72 for movement in a substantially horizontal direction (transverse to the axis of shaft 5) with respect to several cooperating coils contained in a stationary coil assembly 77. Screw 73 passes freely through an enlarged opening 78 in the Mycalex box end 63, and the continuation 75, 76 of screw 73 passes freely through an enlarged opening 79 in the adjacent end of box 17 into the elongated box recess wherein is located bridge 57' and cantilever 54'. Screw 76 passes freely through an elongated slot which extends upwardly from the bottom of bridge 57', and the rounded exposed end of this screw (that is, the end of screw 76 that is opposite to the coupling 75) passes through a hole in clamp plate 55', into engagement with the cantilever 54'. A compression spring 80, one end of which engages the stationary coil assembly 77 and the other end of which engages a nut 81 threaded onto screw 73, biases the transducer core assembly 72, 73 etc. toward the right in FIG. 3, that is, into engagement with the outer face of cantilever 54'.

The tangential force developed on plugs 50, as disc 44 rotates, causes the beams 48 and the cantilevers 54 and 54' to move horizontally (against the restoring force of springs 54 and 54'), moving core 72 horizontally to a position dependent upon the magnitude of the tangential friction force developed on the plugs 50. The small deflection of the core 72 (from its normal or at-rest position) results in the production of a voltage which is proportional to the core deflection or displacement, which is in turn proportional to the friction force developed on plugs 50, which bear against the disc 44. The voltage produced (which is available continuously during the test) appears on the electromechanical transducer output leads 82, and may be continuously recorded. By appropriate initial calibration, this voltage may be read as the friction force. In accordance with the usual practice, excitation leads 83 are also used with the differential-transformer type of transducer 71.

By means of the arrangement described, including the electromechanical transducer 71, the friction force developed on plugs 50, as disc 44 rotates, may be measured.

The removable transducer spacers 74 and the removable bridge spacers 61, 61' provide for a choice of any one of three different vertically-separated plug positions (i.e., any one of three different "tracks") for a test, on the same disc 44. Thus, as desired:

1. no spacers may be used under the transducer and bridges;
2. one spacer may be used under the transducer and bridges; or
3. two spacers may be used under the transducer and bridges.

Of course, it is essential that the same number of spacers be used under the transducer as under the bridges, to provide proper horizontal alignment of the bridge-cantilever-beam-plug assembly and the transducer core assembly.

The second-mentioned or "block" embodiment of the machine of this invention differs from the previously-described "plug" embodiment only in certain details of structure, as will be realized from the the following description of the "block" embodiment. Refer now more particularly to FIG. 7, which is an isometric view of a block beam assembly. In the "block" embodiment, a pair of block beams 95, made like beams 48 of spring-tempered phosphor bronze 20 mils or less thick, are adapted to extend parallel to the longer cross-sectional dimension of chamber 26, at respective opposite sides of the disc 44. Each of the beams 95 has at its center a drilled hole which receives, with a sliding fit, a respective center screw 96, and also has, offset somewhat from its center, another drilled hole which receives, with a sliding fit, a respective mounting screw 97 long enough to act as a stop for friction block 99.

Each pair of screws 96, 97 threads into and threadably supports a respective friction block holder 98. The block holders 98 are of channel-shaped cross-section, the open side of one channel facing that of the other channel, in the space between the beams 95. A friction block 99 is positioned within each respective one of the block holders 98, so that one face of each block 99 can engage a respective circular face of the disc 44. The blocks 99 are preferably made of brass and are of rectangular prismoidal shape, with dimensions of 0.4 inch by 0.245 inch by 0.180 inch; the friction surface to be used during the test is cemented on one of the 0.400 × 0.245 faces of each block. (It should be realized that it is this latter face of each block which comes into engagement with the rotating disc 44.)

Each holder 98, with its respective block 99, is free to move (to a limited extent) with respect to its corresponding beam 95 (in a direction transverse to the beam's length dimension). The calipering mechanism to be described hereinafter (and which is exactly similar in construction to that which is used for the plugs 50) is utilized to urge each of the holders 98, with its block 99, inwardly in the direction mentioned, and thus to urge each of the blocks against the rotating disc. Said mechanism adjusts (and also provides a measure of) the "normal" force holding the blocks 99 against the disc 44.

At the ends of the block beams 95, tie blocks 100, 100' are inserted respectively between the beams to maintain them a fixed distance apart. The tie blocks 100, 100' are generally similar in configuration to the tie blocks 51, 51' previously described. The tie blocks 100, 100' are fastened to the beams 95 by means of the clamp plates 52, 52' previously described, and these blocks are attached to the cantilever springs 54, 54' by means of the clamp plates 55, 55' previously described. The remainder of the mounting construction for the blocks 99 (including the cantilevers, the bridges, etc.) is exactly the same as that previously described in connection with FIGS. 3 and 5.

The operation of the machine when using the friction blocks 99 is exactly like that when using the friction plugs 50. The inner faces of the blocks 99 are held against the circular faces of disc 44. When the disc 44 rotates, a tangential force (friction force) is developed on the blocks 99, and this force tends to move the beams 95 horizontally in one direction or the other, against the restoring force presented by the cantilevers 54 and 54'.

A calipering mechanism was previously referred to in connection with friction plugs 50 and with friction blocks 99. The calipering mechanism, denoted generally by numeral 101, utilizes a pair of oppositely-disposed beams 102 and 103 whose free (lower) ends are bent inwardly toward each other as illustrated (the edges of the beams being shown in FIG. 4). At its lower end, beam 102 has threaded therein a load screw 104, and a load screw 105 is similarly carried by the lower end of beam 103. The threaded ends of the two screws 104 and 105 face each other, and these ends are rounded.

The upper end of beam 102 is attached by means of screws 106 to one lateral face of a rectangular prismoidal block 107 which has a central threaded bore extending therethrough. The upper end of beam 103 is attached by means of screws 108 to the opposite lateral face of block 107. The bore in block 107 threadably engages the central threaded portion of a rod 109 which has relatively short unthreaded portions at its upper and lower ends. A knurled knob 110 is secured by means of a set screw 111 to the upper unthreaded end of rod 109, for manually rotating this rod.

A ram memer 112 has therein a centrally-located reamed hole which rotatably receives the lower unthreaded end of rod 109; ram 112 is held against vertical movement along rod 109 between an upper washer 113 (which engages a shoulder on rod 109) and a lower washer 114 and retaining ring 115. The midportions of beams 102 and 103 engage respective beveled surfaces 116 and 117 formed on opposite sides of ram 112. Beam 102 is held against the surface 116 by means of a clamp plate 118 which spans such surface, screws 119 passing through the ends of this plate and threading into the ram 112. Beam 103 is held against the surface 117 by means of a clamp plate 120 which spans such surface, screws 121 passing through the ends of this latter plate and threading into the ram 112.

The operation of the calipering mechanism 101 should now be clear. When knob 110 is rotated in a direction such as to move ram 112 downwardly with respect to block 107, the arms 102 and 103 are squeezed together, resulting in an increased force on anything clamped between screws 104 and 105. A decreased force results when ram 112 is moved upwardly with respect to block 107.

Two quite similar but differently-sized calipering mechanisms are contemplated according to this invention, one being a "narrow span" caliper (employed when the friction plugs 50 are being utilized in the machine) and the other being a "wide span" caliper (employed when the friction blocks 99 are being utilized in the machine). For the "narrow span" caliper, the block 107 and the ram 112 have smaller horizontal dimensions (in FIG. 1) than do the analogous elements for the "wide span" caliper.

A series of uniformly-spaced lines are engraved on the outer surface of one of the caliper beams (for example, on beam 103, this outer surface being at the right-hand edge of the beam in FIG. 1), to provide a scale the indicator or pointer for which would be the upper end of clamp 120. This caliper beam scale is calibrated in pounds of force exerted between the load screws 104 and 105.

The outer face of each of the plugs 50 has therein a hole drilled with a center drill, into which the inner rounded ends of the respective caliper load screws 104 and 105 are adapted to fit. Likewise, the heads of the center screws 96 each have drilled therein a hole drilled with a center drill, into which the inner ends of the respective caliper load screws 104 and 105 are adapted to fit.

In use, the caliper beams 102 and 103 are inserted down through the duct 92 (see FIGS. 1-2), and the load screws 104 and 105 are brought into engagement with the outer ends of the respective friction plugs 50, or with the outer ends of the respective center screws 96, as the case may be. The upper portion of the mechanism 101 extends upwardly above the Mycalex box cover 88, and the caliper mechanism is in reality "free-floating," being supported essentially only by the engagement of the lower ends of its beams 102 and 103 with the fixed friction plugs or fixed friction block center screws. In practice, a hollow glass cylinder (not shown) may be placed over and around the caliper to maintain it in a vertical position.

The caliper mechanism is adjusted by operation of its knob 110 to apply the desired force in pounds (using the scale on beam 103) to the friction plugs or blocks. This force is the "normal" force on the friction members, and is used as the denominator in order to calculate the coefficient of friction. The friction force (the numerator of the coefficient of friction) is proportional to the measured output from the transducer 71.

For enabling testing of the lubricant sample in chamber 26 at elevated temperatures (for example, it may be desired to test at some particular temperature in the range of room temperature to about 350°F.), means are provided for heating the lubricant bath. A pair of reamed-through holes 34 are machined in box 17, these holes extending from one side to the other of the box (perpendicularly to the plane of the paper in FIG. 2), and in the holes 34 are mounted electrical cartridge heaters of conventional type. An additional reamed-through hole 84 is machined in box 17, this latter hole extending from front to rear of the box (perpendicularly to the plane of the paper in FIG. 4), and in the hole 84 are mounted electrical cartridge heaters of conventional type.

A tapped hole (not specifically shown, but aligned with the larger-diameter hole 85 in box end 63) is provided in the front face of box 17, for reception of a thermocouple (not shown) whose output is indicative of box temperature. The output of this thermocouple is fed to a control circuit of conventional type which has a settable temperature adjustment and which is used to control the energization of the cartridge heaters mounted in the holes 34 and 84. Thus, the box temperature may be maintained at any desired value within the range mentioned hereinabove.

Another tapped hole (not specifically shown, but aligned with the larger-diameter hole 86 in box end 63) is provided in the front of box 17, this latter hole being concentric with a smaller-diameter hole which is drilled through, into the interior of chamber 26. This latter tapped hole receives a thermocouple whose output is thus indicative of lubricant bath temperature, and this latter output may be fed to a suitable temperature recorder.

The Mycalex box end 63 previously described forms, when the machine is completely assembled, one end wall of a Mycalex box which is denoted generally by numeral 87. Box 87, made of the rigid heat insulating material known by the name Mycalex, provides an air space around the aluminum box 17 and serves as a heat shield (particularly useful when the test is being run at an elevated temperature). When the testing machine of the invention is assembled, the lower edges of the box or enclosure 87 (including the end 63) rest on shelf 4, as illustrated in FIG. 1. The three side walls and cover 88 of the open-bottomed Mycalex box subassembly (which forms with end wall 63 a completely enclosed, open-bottomed container) are fastened together along their abutting edges by means of screws 89.

It may be noted, from FIGS. 1 and 3, that the inner walls of the Mycalex box 87 are spaced from the outer walls of the aluminum box 17, thus in effect providing an air space around the latter.

The box cover 88 has therein a square opening 91 which, when the Mycalex box 87 is assembled on the machine, is vertically aligned with the opening 33 in the aluminum box lid 20. A short duct 92 (which may be thought of as a "tunnel," or as an "oil guard") of square cross-section extends through the openings 91 and 33, terminating at the upper end of chamber 26.

Conditions for some friction tests call for the bubbling of a fluid such as air through the lubricant, during the test. To permit this, a centrally-located threaded aperture (opening into the chamber 26) is provided in the bottom of box 17, this aperture being normally closed by a pipe plug 93 (FIG. 4). When it is desired to bubble a fluid through the test lubricant, the plug 93 is removed, and a supply conduit (length of tubing) is passed through a hole provided for this purpose in the Mycalex box end 63, into the space between shelf 4 and the bottom of box 17; the inner end of this supply conduit is suitably sealed into the threaded aperture from which the pipe plug was removed.

There will now be described, by way of example, various tests which may be carried out using the machine herein disclosed (thus setting forth the utility of the same). In general, a wide range of different materials may be used for the friction members (plugs, or blocks) and the disc; either metals or non-metals may be used — in fact, any combination of materials that are solids may be used.

One test concerns itself with the friction characteristics of a lubricant (using, e.g., bronze rubbing on a steel disc), that is, how the coefficient of friction, using this lubricant, varies as the fluid lubricant fatigues or ages, over a life test. The coefficient of friction is measured with the machine as described, for various rubbing speeds (in feet per minute), and observations are made in regard to the variation of these coefficients with time.

In another test, a limited-slip-differential fluid is used as the test lubricant, it being desired to determine how the coefficient of friction of this fluid varies over a fixed period of time, such as 50 hours. For this test, differential clutch plate material rubs on a steel disc, and measurements of the coefficient of friction are made with time.

Another test is concerned with automatic transmission fluid; the life of such fluid may be predicted by the time required for the fluid to change its coefficient of friction. This test would ordinarily be made at an elevated temperature, such as 300°F. Transmission clutch paper rubs on a steel disc, and measurements of the coefficient of friction of the test lubricant (automatic transmission fluid) are made with time.

Still another test simulates gear wear, it being desired to determine the wear rates for different oils. This test would be run at a rather high "normal" pressure, say 10,000 psi. The friction plugs may be bronze, rubbing on a steel disc; the actual amount of wear of the plugs is measured, using a micrometer.

The machine of the invention may be used to measure the coefficients of friction of various new, experimental-type fluids.

Another test simulates the lubrication of the ways of a machine tool. For this test, cast iron rubs on a cast iron disc, and the coefficients of friction for various test lubricants are measured, using the "low speed" motor 12.

The machine of this invention may be operated using test parameters which will now be set forth. The rubbing speed range may be (considering both motors, 10 and 12) zero to 800 feet per minute, or higher. The loading (the "normal" force) range may be 10 to 30,000 psi (this higher value may be easily reached if the diameter of the rubbing or small-diameter ends of the plugs 50 is made sufficiently small). The temperature range, using the cartridge heaters disclosed, may be room temperature to 350°F.; using an environmental test chamber (the entire machine will fit into a test chamber of modest proportions), tests may be run down to −60°F.

It may be noted that, due to the continuous mode of operation of the machine, life tests may be made over a range extending from a few minutes to hundreds of hours. The transducer 71 produces a voltage output continuously, so the friction force may be continuously recorded.

It is pointed out that the machine of this invention is operable over a wide range of coefficients of friction, such as from 0.002 to 1.0.

When using friction plugs 50 of small diameter (1/16 inch or 1/32 inch) in the machine of this invention for wear measurements at high loadings (6,000 to 30,000 psi), vibration occurs along the beam assembly 48, etc. This vibration may be damped by employing an inertia weight 90, as illustrated in FIGS. 8 and 9.

An elongated aluminum plate 94 is attached at its lower end to the outside of the column 3 at the end of the machine opposite to the transducer 71, the plate 94 having at its upper end a hole 122 through which an inertia rod 123 which is threaded at its inner end can freely pass. The inner end of rod 123 passes freely through a clearance hole 124 in the Mycalex box 87, through a clearance hole 125 in the adjacent side wall of the aluminum box 17, and also through a clearance hole 126 in the bridge member 57, and the inner end of the rod 123 threads into a tapped hole provided in the clamp plate 55 which is attached to the cantilever spring 54. Thus, the rod 123 is firmly mechanically attached to the plug beam assembly 48, etc., and can move therewith as the disc 44 rotates.

A "Teflon" plate 127 is secured to the outer face of plate 94, to provide a bearing for the inertia rod 123. The mounting screws 128 for plate 127 pass through slots in this plate to provide for a ± 1/16 inch up and down adjustment, to match the spacers 61 (previously mentioned) under the bridge member 57. Rod 123 passes through a bearing hole 129 in plate 127, which hole is aligned with hole 122 in the aluminum plate 94, but is of smaller diameter so as to provide a bearing for the rod. An inertia weight 90, comprising a solid brass cylinder having an axial bore therein which freely accommodates the rod 123, is secured to the outer end of this rod by means of a set screw 130 which is threaded into a radial tapped hole in the cylinder and the inner end of which engages the rod.

Without the inertia weight described, the friction-measuring cantilever-supported plug beam assembly 48, etc. has no pivots or bearings to adversely affect the precision of measurement. Addition of the inertia weight 90 for wear measurements adds one bearing to the transducer system, to wit, the inertia rod 123 in the "Teflon" bearing of plate 127. This reduces the precision of the measurement slightly, but precise friction values are not necessary in wear testing.

The invention claimed is:

1. Apparatus for friction testing of lubricants, comprising:
   a. a supporting structure;
   b. a rotatable test object, rotatably mounted to the supporting structure, said test object having first and second opposing lateral sides disposed transversely from the axis of rotation;
   c. first and second relatively fixed friction members;
   d. holding means for holding the first relatively fixed friction member against the first lateral side of the rotatable test object and for holding the second relatively fixed friction member against the second lateral side of the rotatable test object and directly opposite the first friction member;
   e. means for applying force to the friction members to urge each friction member against the rotatable test object, thereby creating a frictional force urging the holding means in one tangential direction when the rotatable test object is rotated;
   f. means for applying test lubricant between the relatively fixed friction members and the rotatable test object;
   g. means for rotating the rotatable test object; and
   h. means to detect the force urging the holding means in a tangential direction, thereby determining the frictional force produced between the relatively fixed friction members and the rotatable test object.

2. Apparatus recited in claim 1, wherein the means for applying force to the friction members comprises a caliper mechanism.

3. Apparatus described in claim 2 wherein said caliper mechanism comprises:
   a. two opposed caliper beams having the lower end of each beam bent inwardly toward the opposite beam, and having each lower end engaging a relatively fixed friction member, and
   b. means connected to the upper ends of the beams for moving the lower ends toward or away from each other, thereby increasing or decreasing the pressure exerted on the friction members.

4. Apparatus recited in claim 1, wherein the holding means comprises:
   a. two substantially parallel cantilever springs secured to the supporting structure;
   b. two substantially parallel beams, each having one end attached to the intermediate portion of one of the cantilever springs and having the second end attached to the intermediate portion of the second cantilever spring; and
   c. means, attached to each parallel beam, for housing a friction member on the side of the parallel beam facing the other parallel beam.

5. Apparatus recited in claim 1, wherein the means for applying force to the friction members is entirely supported by the holding means.

* * * * *